US009074904B1

(12) United States Patent
Huang et al.

(10) Patent No.: US 9,074,904 B1
(45) Date of Patent: Jul. 7, 2015

(54) METHOD FOR SOLVING CARPOOL MATCHING PROBLEM AND CARPOOL SERVER USING THE SAME

(71) Applicant: National Taipei University of Technology, Taipei (TW)

(72) Inventors: Shih-Chia Huang, Taipei (TW); Ming-Kai Jiau, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days.

(21) Appl. No.: 14/200,042

(22) Filed: Mar. 7, 2014

(51) Int. Cl.
  *G01C 21/00* (2006.01)
  *G01C 21/34* (2006.01)
(52) U.S. Cl.
  CPC ................................. *G01C 21/3438* (2013.01)
(58) Field of Classification Search
  None
  See application file for complete search history.

(56) References Cited

U.S. PATENT DOCUMENTS

| 5,897,629 | A | 4/1999 | Shinagawa et al. |
| 7,330,840 | B2 | 2/2008 | Straatveit |
| 2004/0225544 | A1 | 11/2004 | Camer |
| 2008/0180243 | A1 | 7/2008 | Aaron |
| 2008/0277183 | A1 | 11/2008 | Huang et al. |

OTHER PUBLICATIONS

Huang et al., "A Genetic Algorithm based Approach to Solve the Carpool Service Problem in Cloud Computing," Thesis of Master degree, Graduate Institute of Computer and Communication, National Taipei University of Technology, Jul. 2012, pp. 1-11.

*Primary Examiner* — Adam Alharbi
(74) *Attorney, Agent, or Firm* — Jianq Chyun IP Office (57) ABSTRACT

The invention discloses a method for solving carpool matching problem and a carpool server using the same. The method includes the following steps: generating a carpool population according to carpool requests received from passengers and drivers; performing a routing procedure to each of the segments, such that a segment fitness value of each of the segments is maximum; performing a calculating procedure to calculate a fitness value of each of the carpool matching results; performing a sorting procedure to sort the carpool matching results as first results and second results; performing a modifying procedure to modify each of the renewed second results by swapping two slots of each of the renewed second results; and performing an updating procedure to update the carpool population according to the first results and the modified second results.

14 Claims, 7 Drawing Sheets

METHOD FOR SOLVING CARPOOL MATCHING PROBLEM AND CARPOOL SERVER USING THE SAME

BACKGROUND

1. Field of the Invention

The invention relates to a method for solving carpool matching problem and a carpool server using the same.

2. Description of Related Art

Due to economic development in recent years which has resulted in industrialization and urbanization, the number of vehicles on roadways has risen rapidly, making traffic congestion an increasingly serious problem in large cities around the world. Severe traffic congestion causes various negative effects including air pollution, loss of valuable time, consumption of fuel, and so on. Public transport systems can reduce traffic congestion effects but unfortunately cannot provide as much flexibility, comfort, and freedom as a private vehicle. For this reason, private vehicles are far and away the dominant commuting method. However, because these private vehicles are often used to transport just one or two people, there are a lot of empty seats on the road. For example, in the UK the average vehicle only has 1.5 people in it. It is obvious that considerable effort is required to solve the above-mentioned problem.

Carpooling is an environmentally friendly transportation system based on the sharing of the empty seats of vehicles, and is one of the most effective solutions to traffic congestion. Drivers share their cars with one or more additional passengers who have a similar destination. By doing so, the occupancy rate of cars could be increased substantially by reducing the number of empty seats in these vehicles. Fewer vehicles would be required to transport the same number of people to their destinations, resulting in a significantly lower number of cars on the road. Additional benefits of carpooling include shared travel costs, reduced energy consumption, and lowered vehicle emissions, among others.

In effort to provide a carpool service, many systems have been proposed which can be broadly classified into two categories according to their features. The first category is website-based and broadcasts the carpool information to an online community platform. These kind of online community platforms provide an interface between the passengers who are looking for a shared ride and the drivers who are offering their vehicle for the shared ride. The carpool users can search all the posted carpool plans and make contact with the provider of the plan which interests them. However, these website-based carpool systems lack integration of geographic information system (GIS) support and thus cannot effectively deal with instant carpool intuitional operation requirements. The second category not only provides a website-based carpool services but also utilizes a digital GIS map to match ride offers to requests. For example, the users of some of the carpool platforms can easily make their carpool requests or offers through the map-based interface. Moreover, some of the carpool platforms also provide a route service based on GIS. However, the applicability of this system in instant scenarios is limited because these systems cannot support the use of the Global Positioning System (GPS) handheld navigation device that provides carpool users with their current location information.

Numerous carpool systems have been proposed to solve traffic congestion problems. Some website-based systems provide basic carpool functions such as the ability to send a carpool request in a given date and time, and then seek suitable carpool partners to meet the demand. Furthermore, several carpool systems integrate a digital GIS map to offer a visual experience with accurate geographical information to those seeking carpool partners. However, these traditional carpool systems are very inconvenient and inefficient for the user who requires real-time carpool matching service. Besides, complexity increases rapidly as the number of carpool users and thus the number of possible solutions grows. Therefore, how to find solutions in a reasonable time becomes a very important issue.

Besides, although there are some algorithms proposed for solving cargo delivery routing problems, these algorithms cannot be directly applied to solve carpool problems. For example, the departing point and the last destination are the same in the cargo delivery routing problems, which is obviously different from ordinary carpool situations. Besides, the time schedule of a driver to delivery cargos is usually fixed, such that the algorithms for solving cargo delivery routing problems may not be able to handle real-time carpool problems.

SUMMARY

Accordingly, the present invention is directed to a method for solving carpool matching problem and a carpool server using the same that could efficiently matching the passengers and the drivers want to use the carpool service.

A method for solving carpool matching problem is introduced herein. The method is adapted to a carpool server. The method includes the following steps: generating a carpool population according to a plurality of carpool requests received from a plurality of passengers and drivers, wherein the carpool population comprises a plurality of carpool matching results, each of the carpool matching results comprises a plurality of segments corresponding to the drivers, and each of the segments comprises a plurality of slots corresponding to some of the passengers; performing a routing procedure to each of the segments, such that a segment fitness value of each of the segments is maximum; performing a calculating procedure to calculate a fitness value of each of the carpool matching results; performing a sorting procedure to sort the carpool matching results as a plurality of first results and a plurality of second results, wherein the fitness value of each of the first results is higher than the fitness value of each of the second results; performing a renewing procedure to renew each of the second results according to the first results; performing a modifying procedure to modify each of the renewed second results by swapping two slots of each of the renewed second results, wherein the two swapped slots correspond to different segments; and performing an updating procedure to update the carpool population according to the first results and the modified second results.

In one embodiment of the present invention, after the step of performing the modifying procedure, the method further includes: performing a replacing procedure to replace a repeated slot of each of the first results and the modified second results with an unallocated passenger.

In one embodiment of the present invention, after the step of performing the modifying procedure, the method further includes: sequentially repeating the routing procedure, the calculating procedure, the sorting procedure, the renewing procedure, the modifying procedure, the replacing procedure and the updating procedure until a best fitness value corresponds to the updated carpool population converges.

In one embodiment of the present invention, the step of performing the routing procedure includes: finding a shortest route to pick up and drop off the passengers correspond to each of the segments.

In one embodiment of the present invention, the step of performing the calculating procedure includes: to one of the carpool matching results, summing the segment fitness value of each of the segments comprised in the one of the carpool matching results.

In one embodiment of the present invention, the step of performing the sorting procedure includes: characterizing a predetermined number of the carpool matching results with the higher fitness value as the first results; and characterizing the uncharacterized carpool matching results as the second results.

In one embodiment of the present invention, the step of performing the renewing procedure includes: choosing an unrenewed second result from the second results; randomly choosing a specific first result from the first results; comparing the segment fitness value of each of the segments comprised in the unrenewed second result with the segment fitness value of each of the corresponding segments comprised in the specific first result; if the segment fitness value of a first segment of the segments comprised in the unrenewed second result is lower than the segment fitness value of a second segment corresponding to the first segment comprised in the specific first result, replacing the first segment with the second segment.

A carpool server is introduced herein. The carpool server includes a communication unit, a storage unit and a processing unit. The communication unit is configured to receive a plurality of carpool requests from a plurality of passengers and drivers. The storage unit is configured to store a plurality of modules. The processing unit is coupled to the communication unit and the storage unit and configured to execute the modules to: generate a carpool population according to the carpool requests received from the passengers and drivers, wherein the carpool population comprises a plurality of carpool matching results, each of the carpool matching results comprises a plurality of segments corresponding to the drivers, and each of the segments comprises a plurality of slots corresponding to some of the passengers; perform a routing procedure to each of the segments, such that a segment fitness value of each of the segments is maximum; perform a calculating procedure to calculate a fitness value of each of the carpool matching results; perform a sorting procedure to sort the carpool matching results as a plurality of first results and a plurality of second results, wherein the fitness value of each of the first results is higher than the fitness value of each of the second results; perform a renewing procedure to renew each of the second results according to the first results; perform a modifying procedure to modify each of the renewed second results by swapping two slots of each of the renewed second results, wherein the two swapped slots correspond to different segments; and perform an updating procedure to update the carpool population according to the first results and the modified second results.

In one embodiment of the present invention, the processing unit is further configured to perform a replacing procedure to replace a repeated slot of each of the first results and the modified second results with an unallocated passenger.

In one embodiment of the present invention, the processing unit is further configured to sequentially repeat the routing procedure, the calculating procedure, the sorting procedure, the renewing procedure, the modifying procedure, the replacing procedure and the updating procedure until a best fitness value corresponds to the updated carpool population converges.

In one embodiment of the present invention, the processing unit is configured to find a shortest route to pick up and drop off the passengers correspond to each of the segments.

In one embodiment of the present invention, to one of the carpool matching results, the processing unit is configured sum the segment fitness value of each of the segments comprised in the one of the carpool matching results.

In one embodiment of the present invention, the processing unit is configured to characterize a predetermined number of the carpool matching results with the higher fitness value as the first results, and characterize the uncharacterized carpool matching results as the second results.

In one embodiment of the present invention, the processing unit is configured to choose an unrenewed second result from the second results; randomly choose a specific first result from the first results; compare the segment fitness value of each of the segments comprised in the unrenewed second result with the segment fitness value of each of the corresponding segments comprised in the specific first result; and if the segment fitness value of a first segment of the segments comprised in the unrenewed second result is lower than the segment fitness value of a second segment corresponding to the first segment comprised in the specific first result, replace the first segment with the second segment.

Based on the above description, the embodiments of the present invention provide a method for solving carpool matching problem and a carpool server using the same. The method proposed in the present invention could find the carpool matching result with near-optimal quality in a reasonable amount of time, such that the proposed method is applicable to real-time carpool services.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

Figure 1:
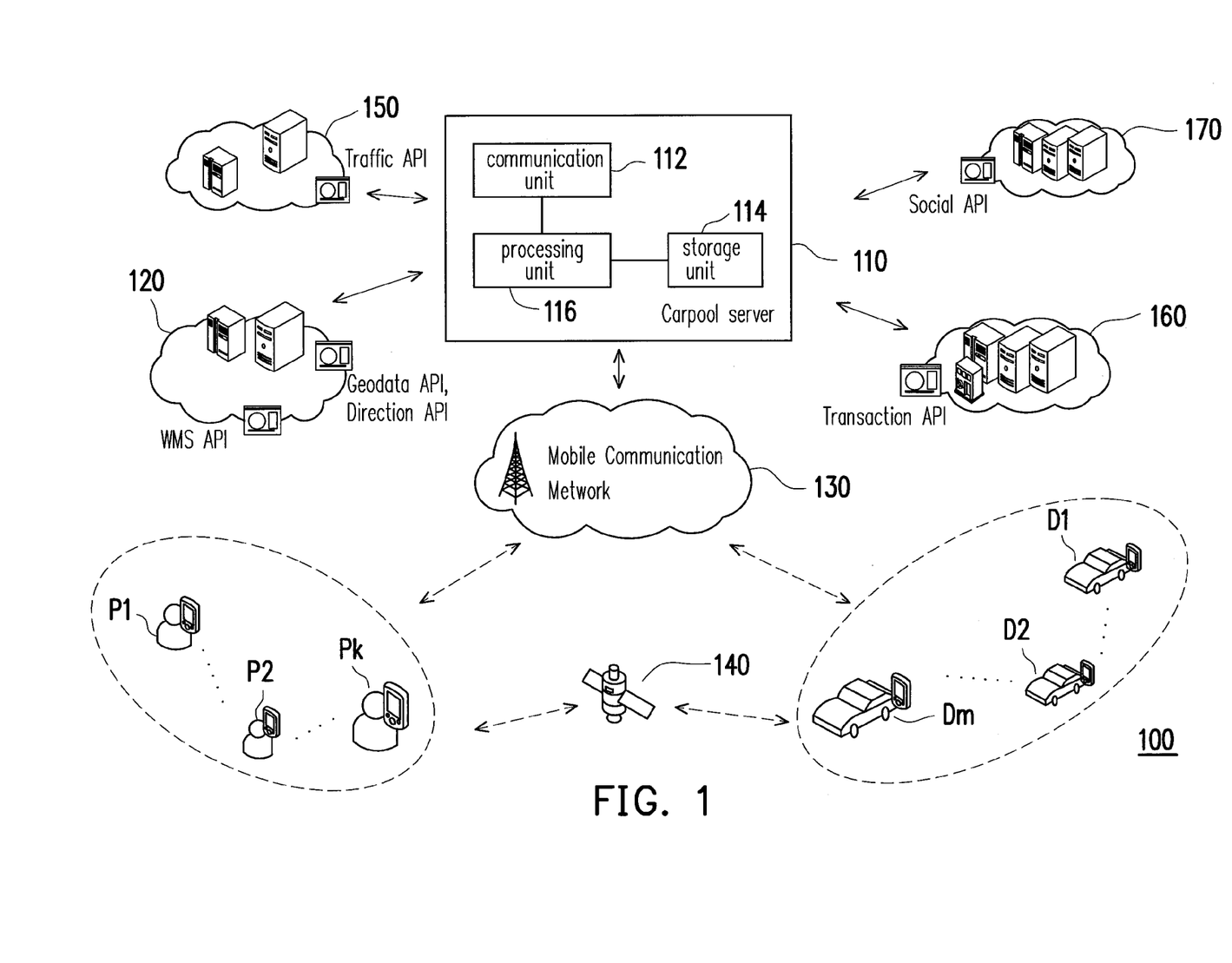
FIG. 1 is a schematic diagram illustrating a carpool system according to an exemplary embodiment of the present invention.

FIG. 1 is a schematic diagram illustrating a carpool system according to an exemplary embodiment of the present invention. In the present embodiment, the carpool system 100 may include a carpool server 110, an open GIS provider 120, a mobile communication network 130, a GPS satellite 140, a traffic monitor 150, a transaction service banker 160, a reputation data provider 170, passengers P1-Pk and drivers D1-Dm (k and m are positive integers).

The carpool server 110 may include a communication unit 112, a storage unit 114 and a processing unit 116. The communication unit 112 can be configured for connecting to a mobile communication network. For example, the communication unit 112 establishes a connection to a telecommunication station for linking the carpool server 110 to the Internet. The mobile communication network can be based on 2G mobile communication technology, 3G mobile communication technology, 3.5G mobile communication technology, 4G mobile communication technology or the like. For example, the mobile communication network can be configured based on General Packet Radio Service (GPRS), Code Division Multiple Access (CDMA), High Speed Downlink Packet Access (HSDPA) or other equivalent mobile network technology. In the embodiment, communication unit 112 is not limited to adopt a specific mobile network technology.

The storage unit 114 is one or a combination of a stationary or mobile random access memory (RAM), read-only memory (ROM), flash memory, hard disk, or any other similar device, and which records a plurality of modules that can be executed by the processing units 116. These modules can be loaded into the processing unit 116 to execute a method for solving carpool matching problem.

The processing unit 116 is one or a combination of a central processing unit (CPU), a programmable general- or specific-purpose microprocessor, a digital signal processor (DSP), a programmable controller, application specific integrated circuits (ASIC), a programmable logic device (PLD), or any other similar device. The processing unit 116 is coupled to the communication unit 112 and the storage unit 114. The processing units 116 access and execute the modules recorded in the storage unit 114 to execute a method for solving carpool matching problem proposed in the present invention, which would be introduced later.

When the passengers P1-Pk want to ask for the carpool service provided by the carpool server 110, the passengers P1-Pk may send carpool requests to the carpool server 110 through the mobile communication network 130 by operating, for example, a carpool application installed in electronic apparatus such as smartphones, tablet, personal digital assistant (PDA) or the like. On the other hand, when the drivers D1-Dm (illustrated as cars) want to chauffeur passengers (i.e., share or provide seats to passengers), the drivers D1-Dm may also send carpool requests to the carpool server 110 through the mobile communication network 130 by operating the aforementioned carpool application.

As shown in FIG. 1, the carpool server 110 may be connected to, the traffic monitor 150, the transaction service banker 160, the reputation data provider 170.

The carpool server 110 may retrieve the real-time traffic or roadway conditions monitored by the traffic monitor 150 and accordingly adjusting the route assigning to the drivers asking for the carpool services for avoiding, for example, traffic congestions.

The transaction services banker 160 may be configured to charge the passengers who have used the carpool services or pay the drivers who have chauffeured passengers.

The reputation data provider 170 may include some social network servers, and hence the reputation data provider 170 may provide personal information of the user (e.g., a passenger or a driver), such as the number of contacts, written posts of the user. With the personal information of the user, the carpool server 110 may evaluate this user. Specifically, the carpool server 110 may simultaneously consider, for example, the number of contacts, written posts of the user and accordingly transform to a credit score of the user. In some embodiments, the carpool server 110 may adaptively adjust the credit score of the user. For example, if the user is punctual, the carpool server 110 may increase the credit score of the user. On the other hand, if the user is not punctual, the carpool server 110 may decrease the credit score of the user.

The aforementioned entities of the carpool system 100 may communicate with each others through corresponding application interfaces (API) as shown in FIG. 1.

In one embodiment, the passengers want to ask for the carpool service may register to the carpool server 110, and the carpool server 110 may assign passenger identifications to these passengers. Similarly, the drivers want to share seats may also register to the carpool server 110, and the carpool server 110 may assign driver identification to these drivers.

For facilitating the carpool service, the carpool request may include information fields such as a category of the requesting user, the user identification, the current location of the user, the destination of the user and the request number of seats. Specifically, the category of the requesting user may be configured to specifying whether the user requesting for the carpool service is a passenger or a driver. The user identification may be the passenger identification or the driver identification of the user requesting for the carpool service.

In some embodiments, the user (e.g., a passenger or a driver) may use the aforementioned electronic apparatuses to retrieve his/her current location (or coordinate) from the GPS satellite 140, and then forward his/her current location (i.e., the aforementioned information field of "the current location of the user") to the carpool server 110 when sending the carpool request. Furthermore, the user may access the map (such as an online map) provided by the open GIS provider 120 and indicate his/her destination, and this information may be forwarded to the carpool server 110 as the aforementioned information field "the destination of the user." The request number of seats may be the needed seats of the user if the user is a passenger, or the provided seats of the user if the user is a driver.

In one embodiment, the information fields included in a carpool request may be implemented as corresponding fields displayed in a user interface of the carpool application for the user to easily enter. Under this situation, the carpool application may integrate the information entered by the user as the carpool request and accordingly forward to the carpool server 110.

With various carpool requests from the passengers and the drivers, the carpool server 110 of the present embodiment may perform the following method for solving carpool matching problem to efficiently match the passengers with the drivers, such that the segment fitness value corresponding to each of the drivers is maximum. In some embodiments, the segment fitness value of a segment is negatively related to its travel cost. Detailed description would be provided hereinafter.

Figure 2:
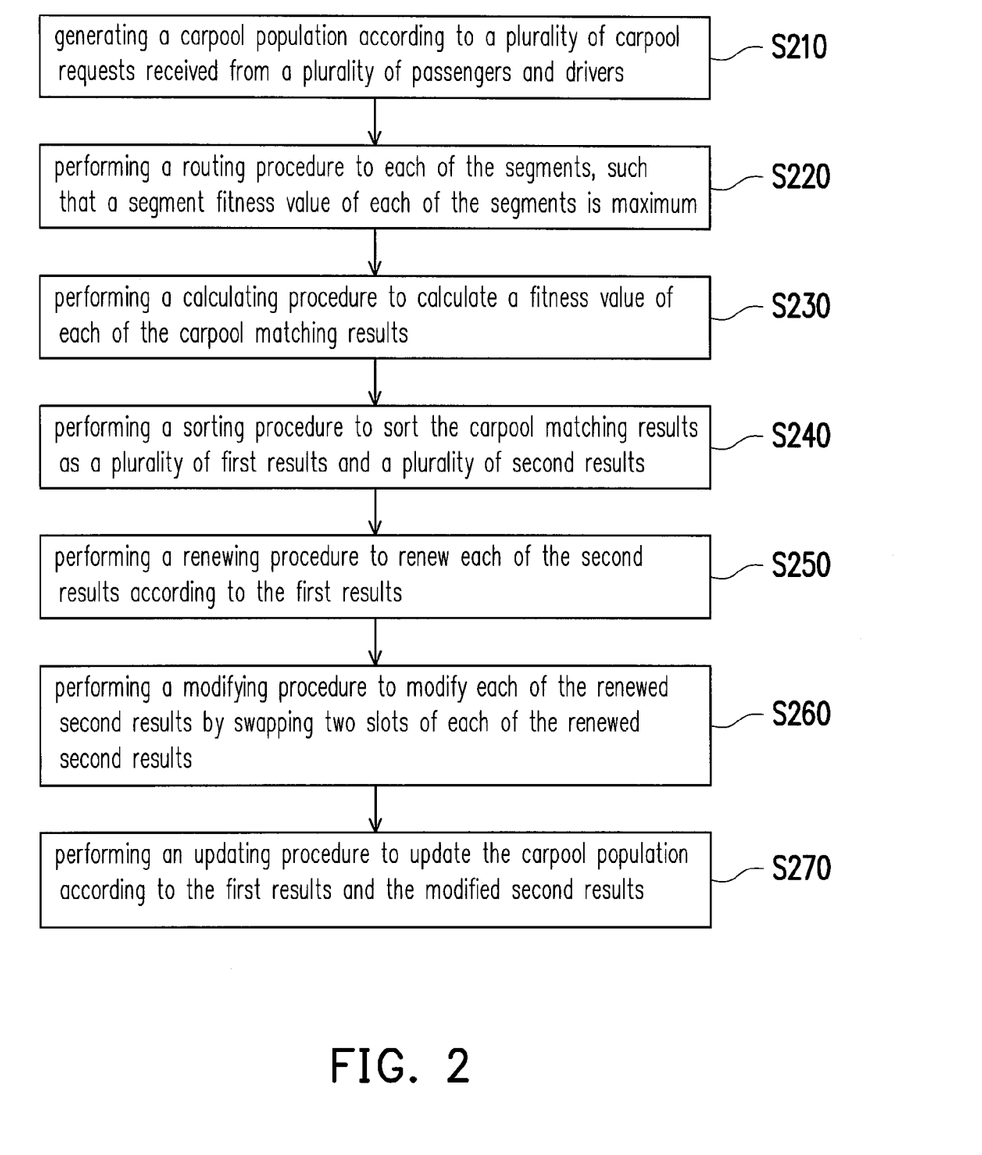
FIG. 2 is a flow chart illustrating the method for solving carpool matching problem according to an exemplary embodiment of the present invention.

FIG. 2 is a flow chart illustrating the method for solving carpool matching problem according to an exemplary embodiment of the present invention. The method proposed in the present embodiment may be executed by the processing unit 116 of the carpool server 110 of FIG. 1, and the details of FIG. 2 would be discussed with references to FIG. 1.

In step S210, the processing unit 116 of the carpool server 110 may generate a carpool population according to a plurality of carpool requests received from a plurality of passengers and drivers. The carpool population may include a plurality of carpool matching results, and each of the carpool matching results includes a plurality of segments corresponding to the drivers. Each of the segments includes a plurality of slots corresponding to some of the passengers.

Figure 3A:
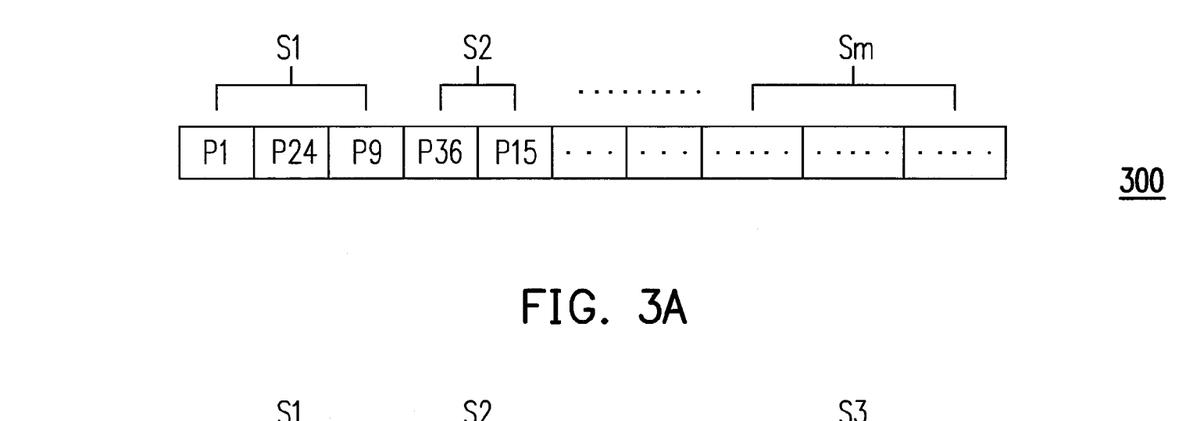
FIG. 3A is a schematic diagram illustrating a carpool matching result according to an exemplary embodiment of the present invention.

Referring to FIG. 3A, FIG. 3A is a schematic diagram illustrating a carpool matching result according to an exemplary embodiment of the present invention. In the present embodiment, after the communication unit 112 of the carpool server 110 receives the carpool requests from, for example, the passengers P1-Pk and the drivers D1-Dm, the processing unit 116 of the carpool server 110 may randomly assign the passengers P1-Pk to the drivers D1-Dm to generate many carpool matching results, such as the carpool matching result 300, according to the received carpool requests. The carpool matching result 300 includes segments S1-Sm, which may respectively correspond to the drivers D1-Dm. As could be observed in FIG. 3A, each of the segments S1-Sm includes some slots, which respectively correspond to a passenger. Specifically, the number of slots included in a segment represents the number of seats that the driver wants to provide. Taking the segment S1 for example, the segment S1 includes slots SL1-SL3, and this represents that the driver D1 wants to provide three seats. Further, since the slots SL1-SL3 are respectively labeled by P1, P24 and P9, this may be regarded that the passengers P1, P24 and P9 are currently assigned to the driver D1.

In some embodiments, the processing unit 116 of the carpool server 110 may generate the aforementioned carpool population by integrating different carpool matching results as a set.

Figure 3B:
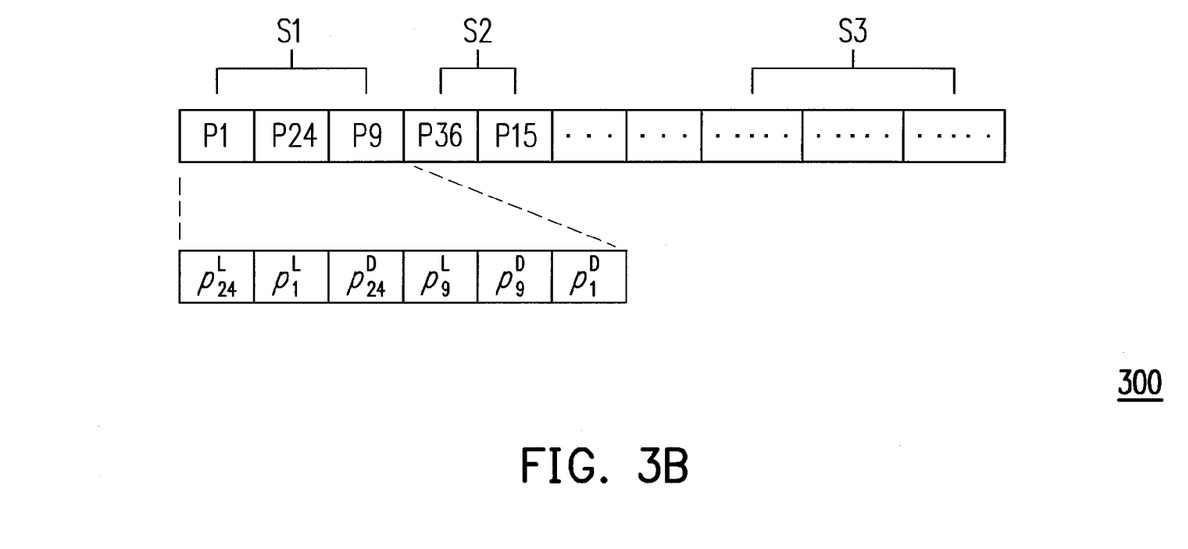
FIG. 3B is a detailed illustration of the carpool matching result illustrated in FIG. 3A.

In other embodiments, each of the segments may be modified to contain routing information. Referring to FIG. 3B, FIG. 3B is a detailed illustration of the carpool matching result illustrated in FIG. 3A. In the present embodiment, the segment S1 could be further divided into specific slots SS1-SS6, which correspond to the order that the driver D1 picks up and drops off the passengers P1, P24 and P9. In detail, $p_i^L$ represents that the current location of the passenger Pi, and $p_i^D$ represents that the destination of the passenger Pi. Therefore, according to the configuration of the specific slots SS1-SS6, the driver D1 sequentially passes by the current locations of the passengers P24 and P1, the destinations of the passenger P24, the current location of the passenger P9, the destination of the passengers P9 and P1. From another point of view, the carpool server 110 hypothetically arrange the driver D1 to sequentially picks up the passengers P24 and P1, drops off the passenger P24, picks up the passenger P9 and drops off the passengers P9 and P1.

Referring back to FIG. 2, in step S220, the processing unit 116 of the carpool server 110 may perform a routing procedure to each of the segments, such that a segment fitness value of each of the segments is maximum. In some embodiments, the segment fitness value of each of the segments could be characterized by a sum of the credit scores of the passengers corresponding to each of the segments or other parameters, which is not limited thereto.

In the following embodiment, the segment fitness value of each of the segments would be discussed under the assumption of being characterized by the routing distance of each of the segments. Specifically, the shorter the routing distance is, the higher the segment fitness value is, and hence the lower the travel cost is. That is, the processing unit 116 of the carpool server 110 may find a shortest route to pick up and drop off the passengers correspond to each of the segments, and this mechanism could be described with reference to FIG. 4.

Figure 4:
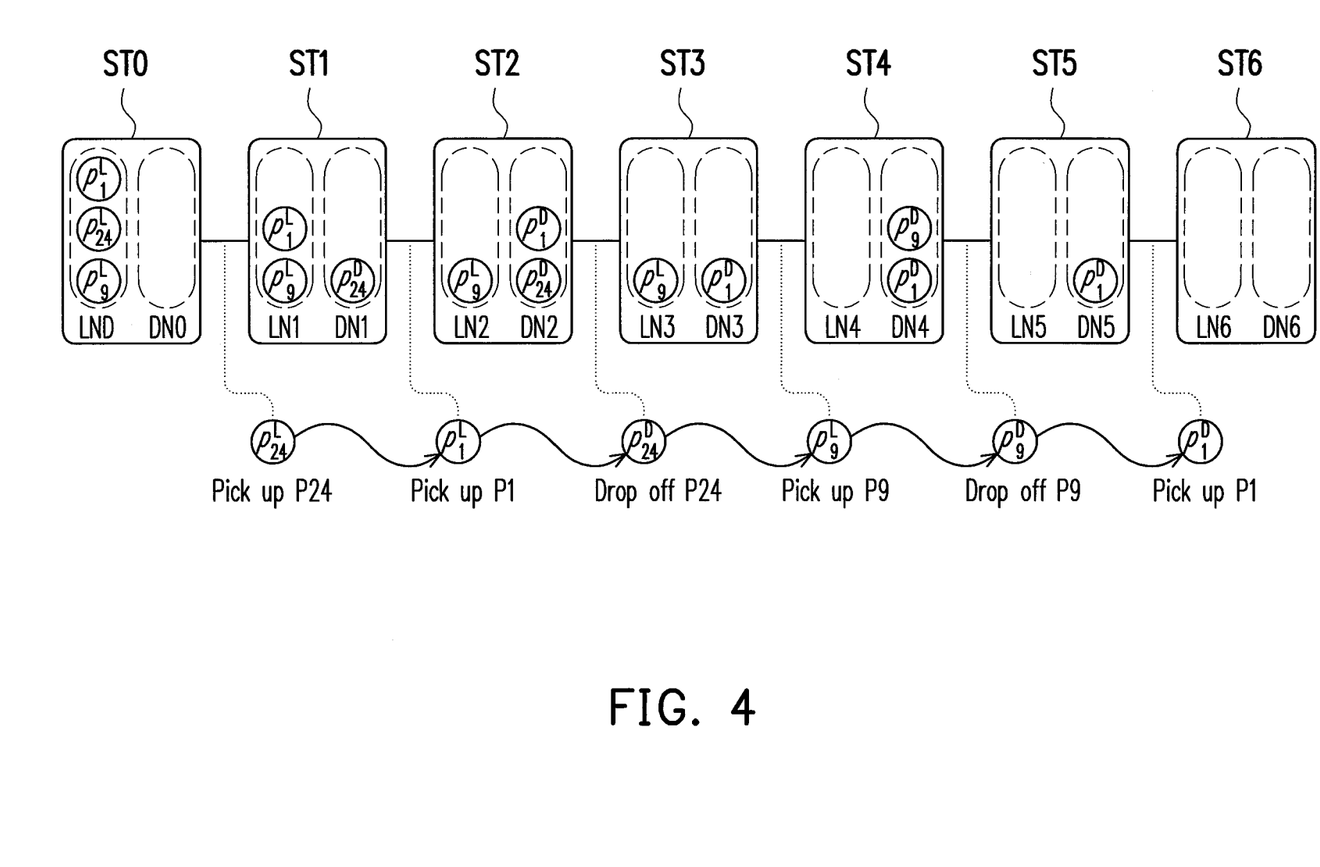
FIG. 4 is a schematic diagram illustrating the routing procedure according to an exemplary embodiment of the present invention.

FIG. 4 is a schematic diagram illustrating the routing procedure according to an exemplary embodiment of the present invention. In the present embodiment, the segment S1 of FIG. 3 would be used as an illustrative example once again. Referring to FIG. 4, the routing procedure of the segment S1 could be partitioned into stages ST0-ST6, which respectively includes a location group and a destination group. Taking the stage ST0 for example, the stage ST0 includes a location group LN0 and a destination group DN0. The location group LN0 includes elements labeled by $p_1^L$, $p_{24}^L$ and $p_9^L$, which represents that the driver D1 corresponding to the segment S1 hasn't passed by any of the current locations of the passengers P1, P24 and P9. The destination group DN0 includes no elements, which represents that the driver D1 hasn't passed by any of the destinations of the passengers P1, P24 and P9. From another point of view, the stage ST0 could be regarded as an initial stage of the routing procedure performed to the segment S1, where the driver D1 hasn't picked up any of the passengers P1, P24 and P9.

At each of the stages ST0-ST6, the processing unit 116 of the carpool server 110 may calculate the distances between the current location of the driver D1 and the current locations of the passengers P1, P24 and P9 listed in the corresponding stage. Meanwhile, the processing unit 116 of the carpool server 110 may calculate the distances between the current location of the driver D1 and the destinations of the passengers P1, P24 and P9 listed in the corresponding stage. With the calculated distances, the driver D1 may set the next place to go as the place having the minimum distance between the current location of the driver D1.

For example, at the stage ST0, the processing unit 116 of the carpool server 110 may firstly retrieve the current location of the driver D1 (hereinafter "the driver location"), and calculate the distances between the driver location and $p_1^L$, $p_{24}^L$ and $p_9^L$. Assuming the distance between the driver location and $p_{24}^L$ is minimum, the processing unit 116 of the carpool server 110 may set the next place to go as the current location of the passenger P24. It should be noted that after the driver D1 arrives the current location of the passenger P24 (i.e., the driver D1 picks up the passenger P24), the processing unit 116 of the carpool server 110 should correspondingly update the driver location as $p_{24}^L$.

Proceeding to the stage ST1, it could be observed that the location group LN1 includes $p_1^L$ and $p_9^L$, and the destination group DN1 includes $p_{24}^D$. That is, the driver D1 hasn't passed by the current locations of the passengers P1 and P9. However, since the passenger P24 has been picked up, the destination group DN1 may include the destination of the passenger P24 (i.e., $p_{24}^D$). Next, the processing unit 116 of the carpool server 110 may calculate the distances between the driver location and $p_1^L$, $p_9^L$ and $p_{24}^D$. Assuming the distance between the driver location and $p_1^L$ is minimum, the processing unit 116 of the carpool server 110 may set the next place to go as the current location of the passenger P1.

Proceeding to the stage ST2, it could be observed that the location group LN2 includes $p_9^L$, and the destination group DN2 includes $p_1^D$ and $p_{24}^D$. That is, the driver D1 hasn't passed by the current locations of the passengers P9. However, since the passenger P24 and P1 have been picked up, the destination group DN2 may include the destinations of the passenger P24 and P1 (i.e., $p_1^D$ and $p_{24}^D$). Next, the processing unit 116 of the carpool server 110 may calculate the distances between the driver location and $p_9^L$, $p_{24}^D$ and $p_1^D$. Assuming the distance between the driver location and $p_{24}^D$ is minimum, the processing unit 116 of the carpool server 110 may set the next place to go as the destination of the passenger P24.

Since the passenger P24 has been chauffeured to his/her destination, the routing procedure does not need to consider the passenger P24 anymore. Therefore, the stage ST3 next to the stage ST2 does not contain routing information related to the passenger P24. The routing procedure of the stages ST3-ST6 could be referred to the routing procedure performed in the stages ST0-ST2, which would not be repeated herein.

After finishing the routing procedure of the segment S1, the carpool sever 110 may transform the total routing distance related to the segment S1 to the segment fitness value of the segment S1.

To each of the segments of FIG. 3A, the processing unit 116 of the carpool server 110 could perform similar routing procedures to the segments S2-Sm, and correspondingly derive the segment fitness values of the segments S2-Sm. It should be noted that since the carpool population includes various carpool matching results, which respectively includes their segments, the processing unit 116 of the carpool server 110 could perform similar routing procedures to all of the segments in the carpool matching results of the carpool population.

Referring back to FIG. 2, in step S230, the processing unit 116 of the carpool server 110 may perform a calculating procedure to calculate a fitness value of each of the carpool matching results. As mentioned before, each of the carpool matching results includes some segments. To one of the carpool matching results, the processing unit 116 of the carpool server 110 may calculate its fitness value by summing the segment fitness values of the segments included in the one of the carpool matching results. Taking the carpool matching result 300 of FIG. 3A as an example, the processing unit 116 of the carpool server 110 may sum the segment fitness values of the segments S1-Sm of the carpool matching result 300.

In step S240, the processing unit 116 of the carpool server 110 may perform a sorting procedure to sort the carpool matching results as a plurality of first results and a plurality of second results. The fitness value of each of the first results is higher than the fitness value of each of the second results. Specifically, the processing unit 116 of the carpool server 110 may sort the carpool matching results in a descending order according to the fitness values of the carpool matching results. Next, the processing unit 116 of the carpool server 110 may characterize a predetermined number (e.g., 10 or other positive integers) of the carpool matching results with the higher fitness value as the first results, and characterize the uncharacterized carpool matching results as the second results.

Figure 5:
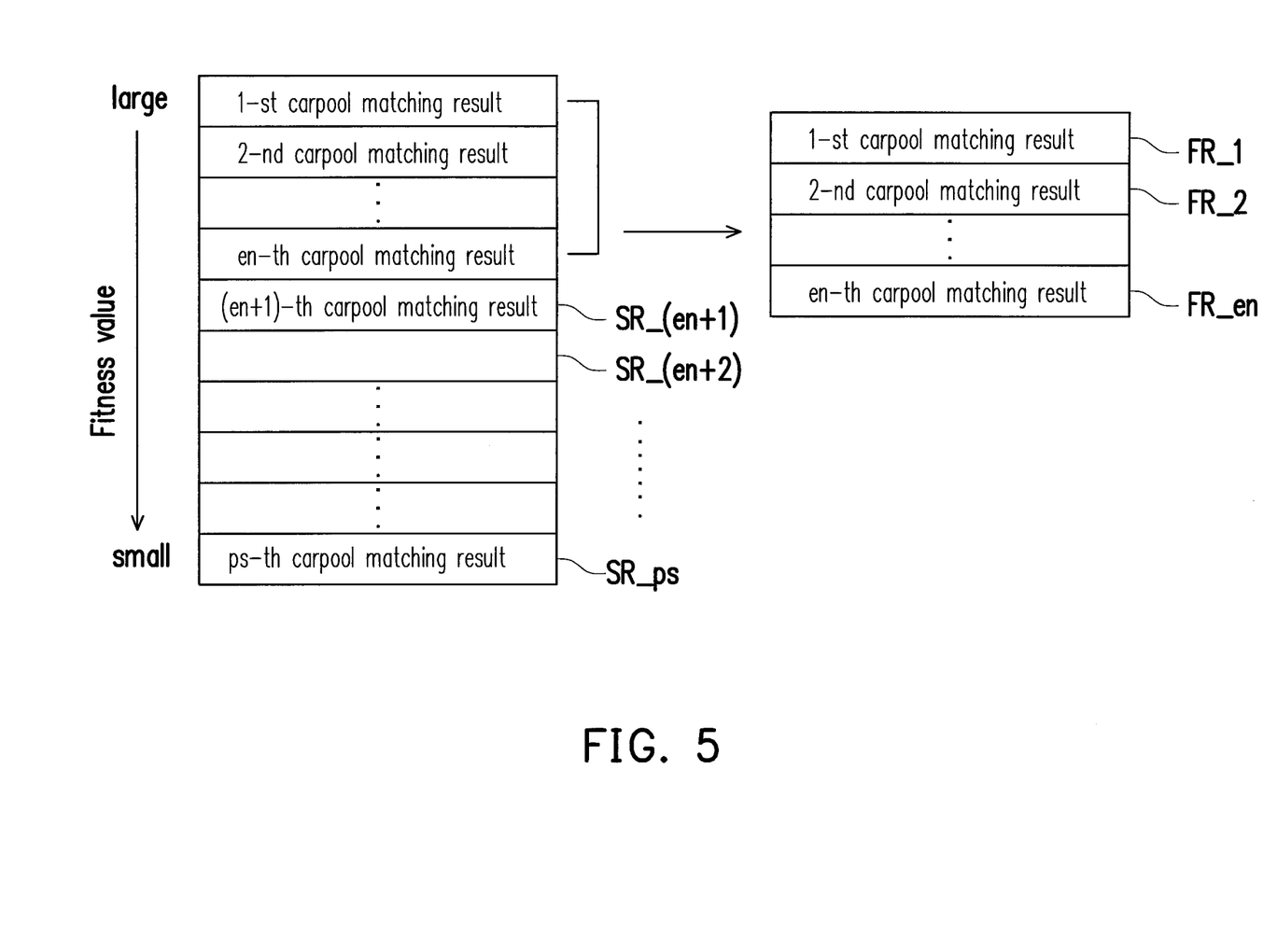
FIG. 5 is a schematic diagram illustrating the sorting procedure according to an exemplary embodiment of the present invention.

Referring to FIG. 5, FIG. 5 is a schematic diagram illustrating the sorting procedure according to an exemplary embodiment of the present invention. In the present embodiment, it is assumed that the total number of the carpool matching results included in the carpool population is ps, and the predetermined number is en.

As shown in FIG. 5 the carpool matching results are sorted in the descending order according to their fitness values. Next, the processing unit 116 of the carpool server 110 may choose en carpool matching results with higher fitness values (e.g., the 1-st carpool matching result to the en-th carpool matching result) and characterize these carpool matching results as first results FR_1-FR_en. Further, the processing unit 116 of the carpool server 110 may characterize the uncharacterized carpool matching results (e.g., the (en+1)-th carpool matching result to the ps-th carpool matching result) as second results SR_(en+1)-SR_ps.

Referring back to FIG. 2, in step S250, the processing unit 116 of the carpool server 110 may perform a renewing procedure to renew each of the second results according to the first results. In one embodiment, the processing unit 116 of the carpool server 110 may choose an unrenewed second result from the second results and randomly choose a specific first result from the first results. Specifically, the probabilities that the first results being chosen to be the specific first result is proportional to their fitness values. That is, the first results with high fitness values would be more probable of being chosen to be the specific first result.

Next, the processing unit 116 of the carpool server 110 may compare the segment fitness value of each of the segments comprised in the unrenewed second result with the segment fitness value of each of the corresponding segments comprised in the specific first result. If the segment fitness value of a first segment of the segments comprised in the unrenewed second result is lower than the segment fitness value of a second segment corresponding to the first segment comprised in the specific first result, the processing unit 116 of the carpool server 110 may replace the first segment with the second segment. That is, if the travel cost of a first segment of the segments comprised in the unrenewed second result is higher than the travel cost of a second segment corresponding to the first segment comprised in the specific first result, the processing unit 116 of the carpool server 110 may replace the first segment with the second segment.

Figure 6:
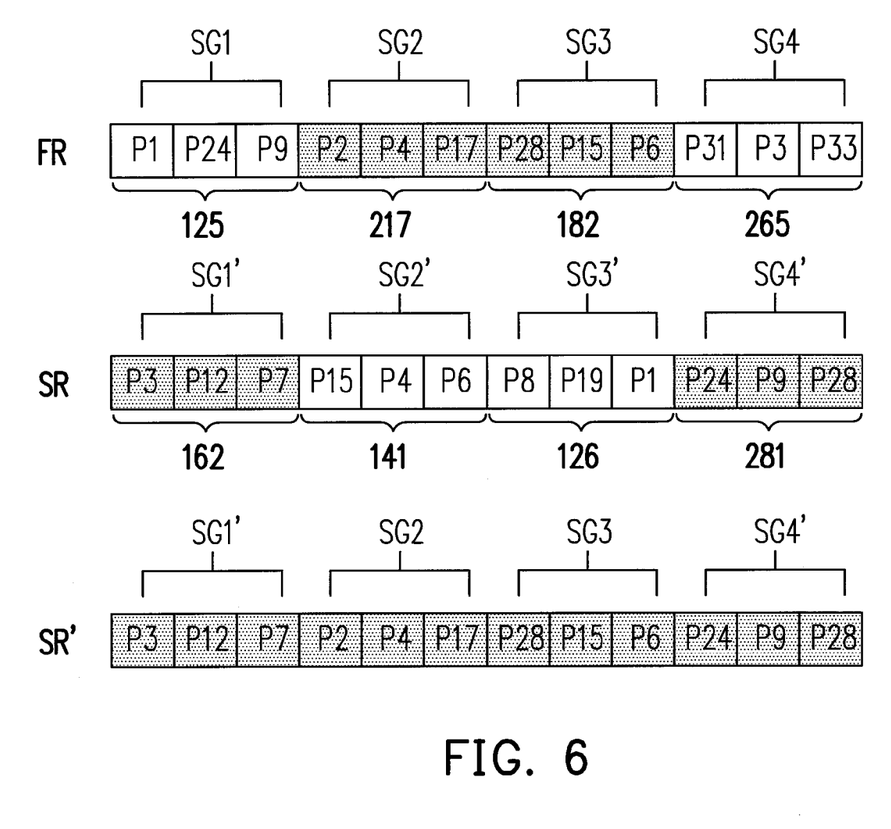
FIG. 6 is a schematic diagram illustrating the renewing procedure performed to one of the unrenewed second results according to an exemplary embodiment of the present invention.

Referring to FIG. 6, FIG. 6 is a schematic diagram illustrating the renewing procedure performed to one of the unrenewed second results according to an exemplary embodiment of the present invention. In the present embodiment, it is assumed that a first result FR is randomly chosen to be the specific first result, and a second result SR is one of the unrenewed second results. The first result FR includes segments SG1-SG4, and the segment fitness values of the segments SG1-SG4 are assumed to be 125, 217, 182 and 265. The second result SR includes segments SG1'-SG4', and the segment fitness values of the segments SG1'-SG4' are assumed to be 162, 141, 126 and 281. According to the previous embodiments, the segments SG1 and SG1' correspond to the same driver, the segments SG2 and SG2' correspond to the same driver, and so on.

In the present embodiment, the processing unit 116 of the carpool server 110 may compare the segment fitness value of the segment SG1 with the segment SG1'. At this time, since the segment fitness value of the segment SG1 (i.e., 125) is lower than the segment fitness value of the segment SG1' (i.e., 162), the processing unit 116 of the carpool server 110 may not replace the segment SG1' with the segment SG1.

The processing unit 116 of the carpool server 110 may subsequently compare the segment fitness value of the segment SG2 with of the segment SG2'. However, since the segment fitness value of the segment SG2 (i.e., 217) is higher than the segment fitness value of the segment SG2' (i.e., 141), the processing unit 116 of the carpool server 110 may replace the segment SG2' with the segment SG2.

Similarly, since the segment fitness value of the segment SG3 (i.e., 182) is higher than the segment fitness value of the segment SG3' (i.e., 126), the processing unit 116 of the carpool server 110 may replace the segment SG3' with the segment SG3. Meanwhile, since the segment fitness value of the segment SG4 (i.e., 265) is lower than the segment fitness value of the segment SG4' (i.e., 281), the processing unit 116 of the carpool server 110 may not replace the segment SG4' with the segment SG4. As a result, the processing unit 116 of the carpool server 110 may assemble the segments SG1', SG2, SG3 and SG4' as the renewed second result SR'.

To each of the second results (e.g., the second results SR_(en+1)–SR_ps of FIG. 5), the processing unit 116 of the carpool server 110 may perform the operation described in the discussion related to FIG. 6 to respectively renew the second results, and the details thereof would not be repeated herein.

Referring back to FIG. 2, in step S260, the processing unit 116 of the carpool server 110 may perform a modifying procedure to modify each of the renewed second results by swapping two slots of each of the renewed second results. The two swapped slots correspond to different segments.

Figure 7:
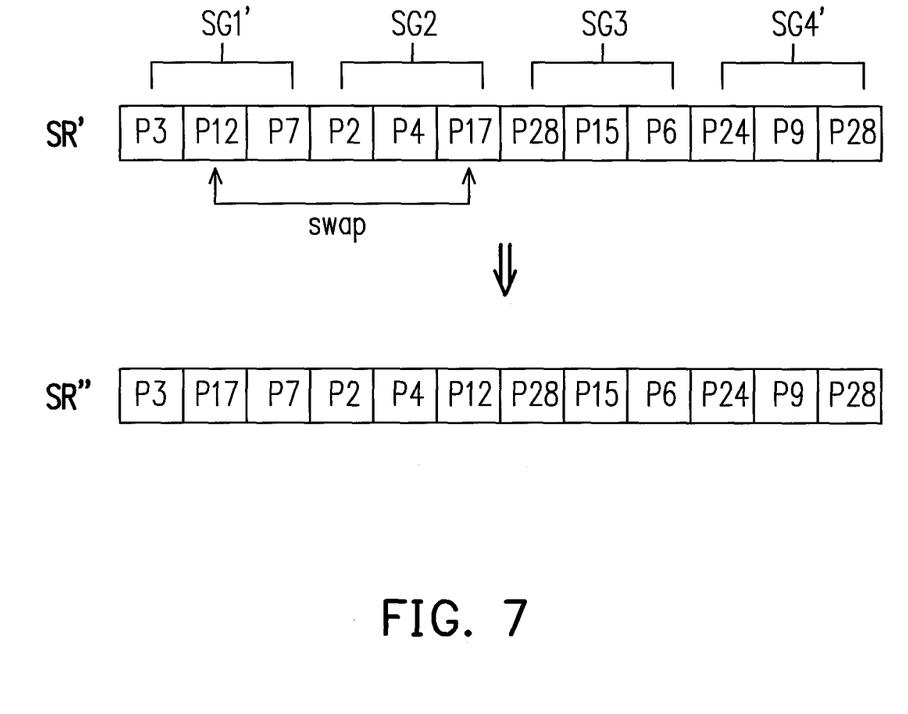
FIG. 7 is a schematic diagram illustrating the modifying procedure according to FIG. 6.

Taking FIG. 7 as an example, FIG. 7 is a schematic diagram illustrating the modifying procedure according to FIG. 6. With the renewed second result SR', the processing unit 116 of the carpool server 110 may randomly choose two of the segments thereof, such as the segments SG1' and SG2. Next, the processing unit 116 of the carpool server 110 may respectively pick one slot of the segments SG1' and SG2 and swap the two picked slots (e.g., the slots corresponding to the passengers P12 and P17). Afterwards, the renewed second result SR' may be represented by a modified second result SR" after being modified.

From another point of view, the modifying procedure could be regarded as the two drivers respectively corresponding to the segments SG1' and SG2 have exchanged one of their passengers.

In other embodiment, the processing unit 116 of the carpool server 110 may firstly divide the considered segments into a first category and a second category according to the segment fitness values thereof. The first category may include the segments with lower segment fitness values, and the second category may include the segments with higher segment fitness values. The processing unit 116 of the carpool server 110 may randomly pick two segments from the first category, respectively pick one slot of the two picked segments and swap the two picked slots.

In some embodiments, the carpool driver 110 may further perform a replacing procedure to replace a repeated slot of each of the first results and the modified second results with an unallocated passenger.

Referring back to FIG. 2, in step S270, the processing unit 116 of the carpool server 110 may perform an updating procedure to update the carpool population according to the first results and the modified second results. In particular, the processing unit 116 of the carpool server 110 may integrate the first results and the modified second results as an updated carpool population.

In some embodiments, the processing unit 116 of the carpool server 110 may sequentially repeat the routing procedure, the calculating procedure, the sorting procedure, the renewing procedure, the modifying procedure, the replacing procedure and the updating procedure until a best fitness value corresponds to the updated carpool population converges. In detail, since the carpool population would be repeatedly updated when the aforementioned procedures are repeatedly performed, the processing unit 116 of the carpool server 110 may find a carpool matching result having the best fitness value among the carpool matching results included in each of the carpool population. If the best fitness value has stayed constant over a predetermined times during the repeatedly performed updating procedures, the processing unit 116 of the carpool server 110 may adopt the carpool matching result corresponding to the best fitness value of the currently considered carpool population as the actual carpool matching result. That is, the processing unit 116 of the carpool server 110 may actually arrange the carpool service provided to the users sending the carpool requests according to the actual carpool matching result.

For example, if the carpool matching result 300 of FIG. 3B is determined to be the actual carpool matching result, the carpool server 110 would actually assign the passengers P1, P24 and P9 to the driver D1 and arrange the route to pick up and drop off the passengers P1, P24 and P9 as illustrated in FIG. 3B.

To sum up, the embodiments of the present invention provide a method for solving carpool matching problem and a carpool server using the same. By repeatedly updating the carpool population according to the procedures of the method, the method proposed in the present invention could find the carpool matching result with near-optimal quality in a reasonable amount of time, such that the proposed method is applicable to real-time carpool services. That is, the total travel cost of the found carpool matching result (i.e., the actual carpool matching result) is very low, and the needed processing time is very little.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for solving carpool matching problem, adapted to a carpool server, comprising:

generating a carpool population according to a plurality of carpool requests received from a plurality of passengers and drivers, wherein the carpool population comprises a plurality of carpool matching results, each of the carpool matching results comprises a plurality of segments corresponding to the drivers, and each of the segments comprises a plurality of slots corresponding to some of the passengers;

performing a routing procedure to each of the segments, such that a segment fitness value of each of the segments is maximum;

performing a calculating procedure to calculate a fitness value of each of the carpool matching results;

performing a sorting procedure to sort the carpool matching results as a plurality of first results and a plurality of second results, wherein the fitness value of each of the first results is higher than the fitness value of each of the second results;

performing a renewing procedure to renew each of the second results according to the first results;

performing a modifying procedure to modify each of the renewed second results by swapping two slots of each of the renewed second results, wherein the two swapped slots correspond to different segments; and performing an updating procedure to update the carpool population according to the first results and the modified second results.

2. The method as claimed in claim 1, wherein after the step of performing the modifying procedure, further comprising:
  performing a replacing procedure to replace a repeated slot of each of the first results and the modified second results with an unallocated passenger.

3. The method as claimed in claim 2, wherein after the step of performing the modifying procedure, further comprising:
  sequentially repeating the routing procedure, the calculating procedure, the sorting procedure, the renewing procedure, the modifying procedure, the replacing procedure and the updating procedure until a best fitness value corresponds to the updated carpool population converges.

4. The method as claimed in claim 1, wherein the step of performing the routing procedure comprising:
  finding a shortest route to pick up and drop off the passengers correspond to each of the segments.

5. The method as claimed in claim 1, wherein the step of performing the calculating procedure comprising:
  to one of the carpool matching results, summing the segment fitness value of each of the segments comprised in the one of the carpool matching results.

6. The method as claimed in claim 1, wherein the step of performing the sorting procedure comprising:
  characterizing a predetermined number of the carpool matching results with the higher fitness value as the first results; and
  characterizing the uncharacterized carpool matching results as the second results.

7. The method as claimed in claim 1, wherein the step of performing the renewing procedure comprising:
  choosing an unrenewed second result from the second results;
  randomly choosing a specific first result from the first results;
  comparing the segment fitness value of each of the segments comprised in the unrenewed second result with the segment fitness value of each of the corresponding segments comprised in the specific first result; and
  if the segment fitness value of a first segment of the segments comprised in the unrenewed second result is lower than the segment fitness value of a second segment corresponding to the first segment comprised in the specific first result, replacing the first segment with the second segment.

8. A carpool server, comprising:
  a communication unit, configured to receive a plurality of carpool requests from a plurality of passengers and drivers;
  a storage unit, configured to store a plurality of modules; and
  a processing unit, coupled to the communication unit and the storage unit and configured to execute the modules to:
    generate a carpool population according to the carpool requests received from the passengers and drivers, wherein the carpool population comprises a plurality of carpool matching results, each of the carpool matching results comprises a plurality of segments corresponding to the drivers, and each of the segments comprises a plurality of slots corresponding to some of the passengers;
    perform a routing procedure to each of the segments, such that a segment fitness value of each of the segments is maximum;
    perform a calculating procedure to calculate a fitness value of each of the carpool matching results;
    perform a sorting procedure to sort the carpool matching results as a plurality of first results and a plurality of second results, wherein the fitness value of each of the first results is higher than the fitness value of each of the second results;
    perform a renewing procedure to renew each of the second results according to the first results;
    perform a modifying procedure to modify each of the renewed second results by swapping two slots of each of the renewed second results, wherein the two swapped slots correspond to different segments; and
    perform an updating procedure to update the carpool population according to the first results and the modified second results.

9. The carpool server as claimed in claim 8, wherein the processing unit is further configured to perform a replacing procedure to replace a repeated slot of each of the first results and the modified second results with an unallocated passenger.

10. The carpool server as claimed in claim 9, wherein the processing unit is further configured to sequentially repeat the routing procedure, the calculating procedure, the sorting procedure, the renewing procedure, the modifying procedure, the replacing procedure and the updating procedure until a best fitness value corresponds to the updated carpool population converges.

11. The carpool server as claimed in claim 8, wherein the processing unit is configured to find a shortest route to pick up and drop off the passengers correspond to each of the segments.

12. The carpool server as claimed in claim 8, wherein to one of the carpool matching results, the processing unit is configured sum the segment fitness value of each of the segments comprised in the one of the carpool matching results.

13. The carpool server as claimed in claim 8, wherein the processing unit is configured to characterize a predetermined number of the carpool matching results with the higher fitness value as the first results, and characterize the uncharacterized carpool matching results as the second results.

14. The carpool server as claimed in claim 8, wherein the processing unit is configured to:
  choose an unrenewed second result from the second results;
  randomly choose a specific first result from the first results;
  compare the segment fitness value of each of the segments comprised in the unrenewed second result with the segment fitness value of each of the corresponding segments comprised in the specific first result; and
  if the segment fitness value of a first segment of the segments comprised in the unrenewed second result is lower than the segment fitness value of a second segment corresponding to the first segment comprised in the specific first result, replace the first segment with the second segment.

* * * * *